United States Patent

Alm

[11] Patent Number: 6,120,221
[45] Date of Patent: Sep. 19, 2000

[54] HOLESAW

[75] Inventor: Sture Alm, Lidköping, Sweden

[73] Assignee: Sandvik Aktiebolag, Sandviken, Sweden

[21] Appl. No.: 09/331,054

[22] PCT Filed: Dec. 17, 1997

[86] PCT No.: PCT/SE97/02147

§ 371 Date: Aug. 25, 1999

§ 102(e) Date: Aug. 25, 1999

[87] PCT Pub. No.: WO98/26890

PCT Pub. Date: Jun. 25, 1998

[30] Foreign Application Priority Data

Dec. 19, 1996 [SE] Sweden .................................. 9604667

[51] Int. Cl.⁷ .................................................. B23B 41/02
[52] U.S. Cl. ......................... 408/204; 408/206; 408/209; 408/703
[58] Field of Search .................. 408/204, 206, 408/207, 209, 703

[56] References Cited

U.S. PATENT DOCUMENTS

| | | |
|---|---|---|
| 2,779,361 | 1/1957 | McKiff . |
| 3,220,449 | 11/1965 | Franklin . |
| 3,360,025 | 12/1967 | Gallo, Sr. . |
| 3,647,310 | 3/1972 | Morse . |
| 3,758,221 | 9/1973 | Meshulam . |
| 3,784,316 | 1/1974 | Bittern . |
| 3,837,759 | 9/1974 | Bittern . |
| 3,854,840 | 12/1974 | Miyanaga . |
| 3,880,546 | 4/1975 | Segal . |
| 3,973,862 | 8/1976 | Segal . |
| 4,036,560 | 7/1977 | Clark et al. . |
| 4,148,593 | 4/1979 | Clark . |
| 4,422,811 | 12/1983 | Ellison et al. . |
| 4,669,928 | 6/1987 | Mediavilla . |
| 4,968,189 | 11/1990 | Pidgeon . |
| 5,035,548 | 7/1991 | Pidgeon . |
| 5,076,741 | 12/1991 | Littlehorn . |
| 5,082,403 | 1/1992 | Sutton et al. ........................... 408/209 |
| 5,096,341 | 3/1992 | Depres .................................... 408/209 |
| 5,108,235 | 4/1992 | Czyzewski . |
| 5,154,552 | 10/1992 | Koetsch .................................. 408/209 |
| 5,226,762 | 7/1993 | Ecker . |
| 5,246,317 | 9/1993 | Koetsch et al. . |
| 5,597,274 | 1/1997 | Behner . |
| 5,658,102 | 8/1997 | Gale . |
| 5,934,845 | 8/1999 | Frey ....................................... 408/204 |

FOREIGN PATENT DOCUMENTS

| | | |
|---|---|---|
| 2 257 381 | 1/1993 | United Kingdom . |
| 97/14526 | 4/1997 | WIPO . |
| 97/15413 | 5/1997 | WIPO . |

*Primary Examiner*—Daniel W. Howell
*Assistant Examiner*—Monica Carter
*Attorney, Agent, or Firm*—Burns, Doane, Swecker & Mathis, L.L.P.

[57] ABSTRACT

A holesaw includes an arbor for supporting a pilot drill and a bell-shaped sawblade. The sawblade is attached to a lower threaded portion of the arbor. A pin support with at least one pin engages the top of the holesaw blade and is axially movable but not rotationally movable relative to the arbor. A clamping sleeve is threaded onto an upper threaded portion of the arbor. The clamping sleeve can be screwed down to press against the bell top of the sawblade. A spring may be disposed between the clamping sleeve and the pin support.

14 Claims, 1 Drawing Sheet

HOLESAW

BACKGROUND

Holesaws are used with power drills to make large diameter holes in relatively thin materials with limited machine power, since they convert only a limited annular region to sawdust and chips. Traditionally, holesaws comprise an arbor with one or more threaded areas, a central pilot drill attached to the arbor, an axially movable pin support which is rotationally locked to the arbor and provided with one or more pins, and a bell-shaped holesaw blade which is made to rotate with the arbor by the pins penetrating pin holes in a flat top of the bell. The rotational locking of the pin support to the arbor occurs usually by having a profiled hole in the pin support slide along a correspondingly profiled part of the arbor as in patents U.S. Pat. Nos. 4,063,560 and 5,076,741, or by having a flange fixed to the arbor acting directly on the pins as in patents U.S. Pat. Nos. 4,669,928 and 4,968,189. The upper shank of the arbor is made for easy attachment to the power drill, conical, cylindrical or hexagonal.

One common demand when using holesaws is that it should be possible to exchange the sawblade without removing the other components from the power drill. For this purpose the sawblade has a threaded center hole attached to a threaded end of the arbor, and can be quickly removed by rotating it after moving the pin support axially to disengage the pins from the top of the bell. To allow drilling vertically upwards, the pin support must be securable against unintentional displacement, as by a locking spring in U.S. Pat. No. 4,036,560 or by a nut as in U.S. Pat. No. 4,669,928.

The holesaw is rotationally guided by the pins and axially by the threaded center hole. Modem sawblades are often made from thin walled material, which makes the thread prone to wear, and the top of the bell has a low stiffness for axial and tilting motions. Therefore, it is preferred to press an end surface of the pin support against the top of the bell by a snap lock spring as in U.S. Pat. No. 4,036,560, by a spring loaded washer as in U.S. Pat. No. 3,784,316 or by a nut as in U.S. Pat. No. 3,758,221. It has also been suggested in application SE 95 03797-4 to press against the top of the bell the end of a tubular sleeve located concentrically outside the pin support by rotation of the same nut that secures the pin support axially, in order to apply the force at a greater radius measured from the arbor.

All mown designs of holesaws have disadvantages in common. If they use a nut or a spring loaded washer, two hands are needed for changing sawblade. If they use a snap lock spring, neither the size nor the symmetry of the load is controlled. The present invention concerns a new type of holesaw where a change of sawblade can be made with one hand.

BRIEF DESCRIPTION OF THE DRAWINGS

The features and advantages of the present invention are well understood by reading the following detailed description in conjunction with the drawings in which like numerals indicate similar elements and in which.

Figure 2:
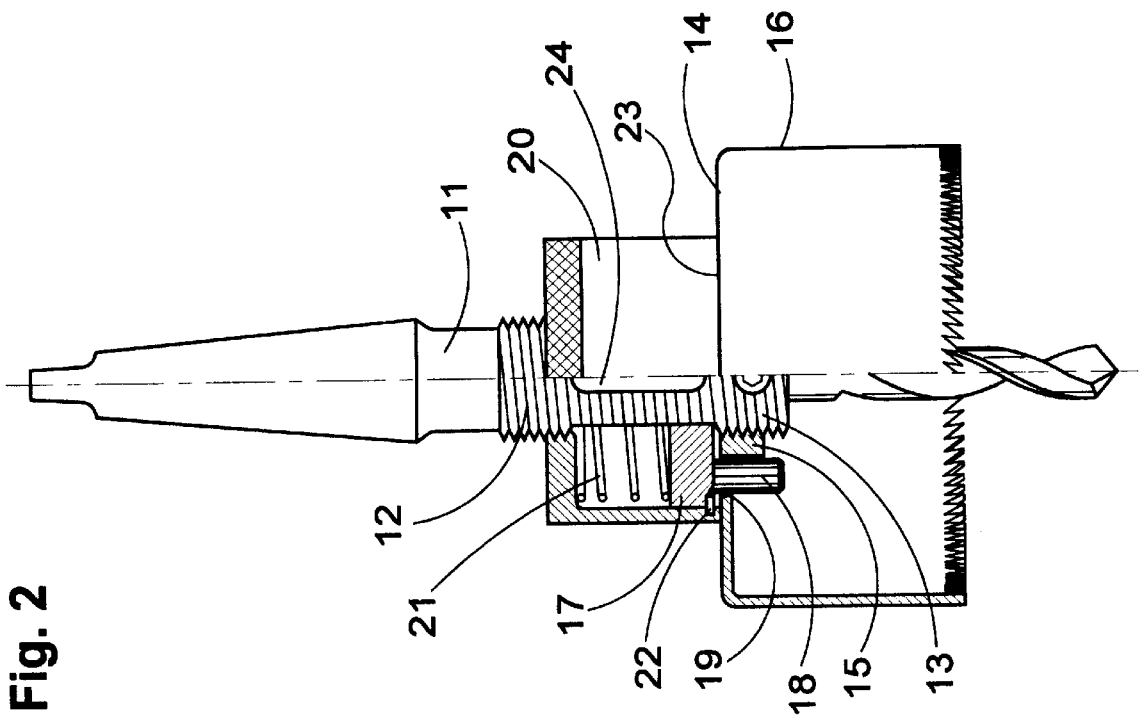
FIG. 2 is a partially cross-sectional view of a holesaw according to an embodiment of the present invention when ready for use.
Figure 1:
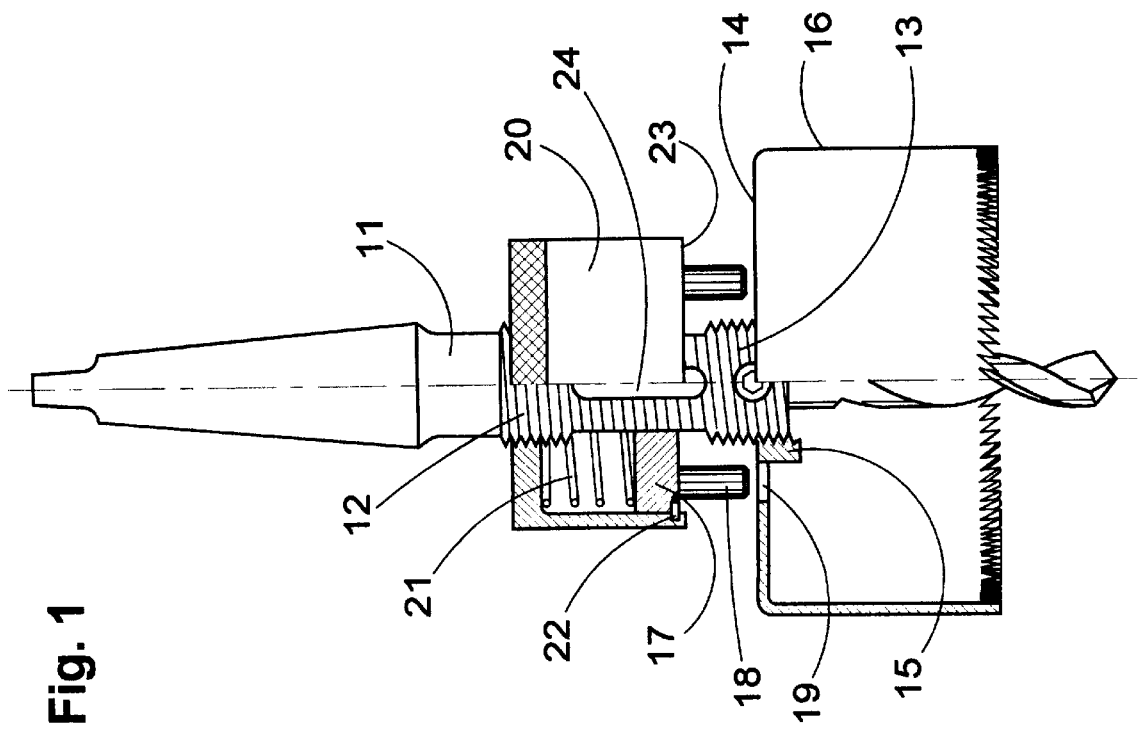
FIG. 1 is a partially cross-sectional view of a holesaw according to an embodiment of the present invention, with components positioned for mounting or dismounting.

A holesaw of the type according to the invention is shown in FIG. 1 and 2 and comprises an arbor (11) with one or more threaded portions (12,13) and a pilot drill at the lower end, a bell-shaped sawblade consisting of a flat bell top (14) with a center hole (15) which can be attached to the lower threaded portion (13) of the arbor and an annular sawing part (16), a pin support (17) which is rotationally locked to the the arbor (11) and provided with at least one pin (18) which can penetrate a corresponding pin hole (19) in the bell top (14) to transfer torque to the sawblade.

A holesaw according to the invention also comprises a clamping sleeve (20) concentrically surrounding the pin support (17) and threaded onto an upper threaded portion (12) of the arbor, and a spring (21) acting between the clamping sleeve and the pin support The clamping sleeve has means for restricting the downward displacement of the pin support (17) and lifting it when the sleeve is moved upward, such as inward pointing pegs or a spring washer (22), and its outer surface has such an exterior surface structure that it can be easily turned by hand.

FIG. 1 shows that when the arbor is ready for mounting of a sawblade, the clamping sleeve (20) should be high up on threaded portion (12). The pin support (17) when the clamping sleeve is pressed by the spring (21) down against the lifting means (22), the pins (18) protruding below the edge of the clamping sleeve. The pin support is axially movable along the arbor, but rotationally restricted by wedge grooves, splines or flat milling of a portion (24) of the arbor bet the upper (12) and the lower (§13) threaded portions. The sawblade can now be threaded onto the lower threaded portion (13) of the arbor, since the center hole (15) in its bell top (14) is threaded if the material thickness is sufficient, or is provided with a threaded collar. The sawblade is rotated until it is immediately below the clamping sleeve and the bell top is touched by the pins (18). During continued rotation the pin holder (17) is lifted until the pin holes (19) are right below the pins (18) which are then pressed down into the pin holes by the spring (21) to stop further rotation. Thereafter, the clamping sleeve (20) is screwed downward until its lower edge (23) axially supports the bell top (14) of the sawblade in an annular region surrounding the pins (18) and the pin holes (19) as shown in FIG. 2. The holesaw is then ready for use, and is much more stable than conventional holesaws where axial forces are only applied at the center thread (15).

When a sawblade is to be changed, the clamping sleeve (20) is screwed upward so that its lower edge (23) first loses contact with the bell top (14), and subsequently the lifting means (22) lifts the pin holder (17) to disengage the pins (18) from the pin holes (19), as shown in FIG. 1. After that, the sawblade is rotated in the opposite direction until it can be taken off the lower threaded portion (13) of the arbor. Preferably, the clamping sleeve is then screwed a short distance downward to make ready for mounting a new sawblade.

On a holesaw according to the invention, the underside of the pin holder (17) and the lower edge (23) of the clamping sleeve should be approximately at the same level to cause the lowest possible bending stress in the pins (18). The holesaw is independent of metal particles or small deformations or tapering near the center hole, which would only cause the pin holder to settle at a slightly higher level. Should any particles be stuck between the sleeve edge (23) and the bell top (14), his is easy to notice and remove.

If the upper and lower portions (12,13) of the arbor are long enough, preferably continuous with the same read diameter, and the sawn-out plug has stuck inside the sawblade, as commonly happens when sawing wood or plastics, it is possible to remove the plug by first screwing the clamping sleeve far upward to a position corresponding to FIG. 1, thereafter also the holesaw blade upward until the plug is forcibly removed by the lower end of the arbor.

It is also possible to make the threaded portions (12,13) with different diameters, not continuing over the intermediate portion (24), which may simplify assembly of the clamping sleeve (20).

While this invention has been illustrated and described in accordance with a preferred embodiment, it is recognized that variations and changes may be made therein without departing from the invention as set forth in the claims.

What is claimed is:

1. A holesaw comprising:

an arbor adapted to support a pilot drill;

a sawblade with a bell top and an annular sawing part attached to the top;

a pin support including at least one pin;

a clamping sleeve;

the pin support being non-rotatable relative to the arbor but axially displaceable along a portion of the arbor;

the clamping sleeve being rotatably threaded on an upper threaded portion of the arbor and concentrically enclosing the pin support with only the at least one pin projecting below an edge of the clamping sleeve to engage at least one corresponding pin hole in the bell top, the bell top being attached to a lower threaded portion of the arbor;

the pin support being axially movable between an upper and a lower position within the clamping sleeve; and a spring for pressing the pin support towards the lower limiting position.

2. A holesaw according to claim 1, wherein the upper threaded portion is long enough to permit the clamping sleeve to be screwed down until the lower sleeve edge presses against the bell top of the sawblade threaded onto the lower threaded portion of the arbor.

3. A holesaw according to claim 1, wherein the portion of the arbor along which the pin support is displaceable is non-circular and includes one or more key grooves.

4. A holesaw according to claim 1, wherein the portion of the arbor along which the pin support is displaceable is non-circular and includes one or more flat faces.

5. A holesaw according to claim 1, wherein the upper and lower portions of the arbor have a continuous thread and are of equal diameter.

6. An arbor for a holesaw, comprising:

an arbor having an upper threaded portion, a lower threaded portion, and a middle portion between the upper and lower threaded portions, the arbor being adapted to support a pilot drill at a lower end thereof and a sawblade with a bell top and an annular sawing part on the the lower threaded portion;

a pin support including a pin extending from a bottom surface of the pin support, the pin support being mounted on the middle portion of the arbor and being axially displaceable but non-rotatable relative to the arbor;

a clamping sleeve screwed onto the upper threaded portion; and a spring disposed around the arbor between the clamping sleeve and the pin support.

7. The arbor as set forth in claim 6, wherein the clamping sleeve includes an annular portion surrounding the spring.

8. The arbor as set forth in claim 7, wherein the clamping sleeve includes an annular portion surrounding the pin support.

9. The arbor as set forth in claim 6, wherein the clamping sleeve includes an annular portion surrounding the pin support.

10. The arbor as set forth in claim 6, wherein the arbor includes an axial opening for receiving the pilot drill.

11. The arbor as set forth in claim 10, wherein the arbor includes a set screw for locking the pilot drill relative to the arbor.

12. The arbor as set forth in claim 6, wherein the middle portion of the arbor is non-circular.

13. The arbor as set forth in claim 12, wherein the middle portion of the arbor includes at least one key groove for receiving at least one corresponding key on the pin support.

14. The arbor as set forth in claim 12, wherein the middle portion of the arbor includes at least one flat face.

* * * * *